United States Patent [19]

Jinnai et al.

[11] 4,438,440

[45] Mar. 20, 1984

[54] PRINT-DISTORTION COMPENSATING DEVICE FOR THE INK JET PRINTING APPARATUS

[75] Inventors: Koichiro Jinnai; Yutaka Ebi, both of Kawasaki, Japan

[73] Assignee: Ricoh Company, Ltd., Japan

[21] Appl. No.: 325,302

[22] Filed: Nov. 27, 1981

[30] Foreign Application Priority Data

Nov. 26, 1980 [JP] Japan ................................ 55-167165
Nov. 29, 1980 [JP] Japan ................................ 55-168182

[51] Int. Cl.$^{3}$ ............................................ G01D 15/18
[52] U.S. Cl. ................................ 346/75; 346/140 R
[58] Field of Search .............................. 346/140 IJ, 75

[56] References Cited

U.S. PATENT DOCUMENTS

| | | | |
|---|---|---|---|
| 3,946,399 | 3/1976 | Zaretsky | 346/1 |
| 4,229,749 | 10/1980 | Fillmore | 346/75 |
| 4,310,845 | 1/1982 | Tsao | 346/75 |
| 4,313,123 | 1/1982 | Jinnai et al. | 346/75 |
| 4,364,061 | 12/1982 | Horike et al. | 346/75 |

*Primary Examiner*—E. A. Goldberg
*Assistant Examiner*—Derek Jennings
*Attorney, Agent, or Firm*—Guy W. Shoup; Gerard F. Dunne

[57] ABSTRACT

A print-distortion compensating apparatus and method for an improved electrostatic type ink jet printing apparatus including a print-distortion compensating means, in which the compensating amounts for the print-distortion due to the influence of the neighboring ink droplets, such print-distortion being variable depending on the respective deflection steps, for instance, the print-distortion caused by the variation of aerodynamic resistance due to the preceding ink droplets, the Coulomb's force due to the preceding and subsequent charged ink droplets, and the charge induction due to the preceding charged ink droplets are memorized into and read out from the afore-mentioned print-distortion compensating means and those are finally added to or not added to the basic charging codes depending on presence or absence of the PRINT data on the ink droplets adjacent to an ink droplet to be charged.

10 Claims, 5 Drawing Figures

FIG.2

| STAGE | $F_3$ | $F_2$ | $F_1$ | $V_{CS}$ | $P_1$ | $P_2$ | $P_3$ | $P_4$ | STAGE | $F_3$ | $F_2$ | $F_1$ | $V_{CS}$ | $P_1$ | $P_2$ | $P_3$ | $P_4$ |
|---|---|---|---|---|---|---|---|---|---|---|---|---|---|---|---|---|---|
| 1 | 000 | 000 | 001 | 209 | 01E | 008 | 000 | 000 | 17 | 002 | 004 | 00F | 435 | 00E | 00C | 009 | 007 |
| 2 | 000 | 000 | 002 | 22D | 00A | 008 | 001 | 001 | 18 | 002 | 005 | 00F | 457 | 00F | 00D | 009 | 007 |
| 3 | 000 | 001 | 003 | 251 | 00A | 003 | 001 | 001 | 19 | 002 | 005 | 00F | 478 | 010 | 00D | 009 | 008 |
| 4 | 000 | 001 | 003 | 274 | 00B | 004 | 001 | 001 | 20 | 002 | 005 | 010 | 499 | 010 | 00D | 009 | 009 |
| 5 | 000 | 001 | 004 | 297 | 00B | 004 | 002 | 002 | 21 | 002 | 006 | 010 | 4BA | 011 | 00F | 009 | 009 |
| 6 | 000 | 001 | 005 | 2BA | 00B | 006 | 002 | 002 | 22 | 002 | 006 | 010 | 4DB | 012 | 00F | 009 | 00A |
| 7 | 000 | 001 | 006 | 2DD | 00C | 006 | 003 | 002 | 23 | 002 | 007 | 011 | 4FC | 012 | 00F | 009 | 00A |
| 8 | 001 | 001 | 007 | 300 | 00D | 007 | 003 | 002 | 24 | 003 | 007 | 011 | 51D | 013 | 00F | 009 | 00B |
| 9 | 001 | 002 | 008 | 323 | 00E | 007 | 003 | 002 | 25 | 003 | 007 | 011 | 53D | 015 | 010 | 009 | 00C |
| 10 | 001 | 002 | 009 | 346 | 00E | 008 | 004 | 003 | 26 | 003 | 007 | 011 | 55D | 015 | 011 | 009 | 00C |
| 11 | 001 | 002 | 00A | 369 | 00E | 008 | 004 | 003 | 27 | 004 | 008 | 012 | 57D | 016 | 011 | 00A | 00D |
| 12 | 001 | 002 | 00B | 38B | 00D | 009 | 005 | 003 | 28 | 004 | 008 | 012 | 59C | 016 | 013 | 00B | 00D |
| 13 | 002 | 003 | 00C | 3AD | 00D | 00A | 005 | 004 | 29 | 004 | 008 | 012 | 5BB | 017 | 013 | 00D | 00E |
| 14 | 002 | 003 | 00D | 3CF | 00D | 00B | 006 | 005 | 30 | 000 | 008 | 012 | 5DA | 018 | 013 | 00E | 00E |
| 15 | 002 | 003 | 00E | 3F1 | 00E | 00B | 007 | 005 | 31 | 000 | 7FF | 012 | 5F9 | 019 | 014 | 00F | 00F |
| 16 | 002 | 004 | 00F | 413 | 00E | 00C | 008 | 006 | 32 | 000 | 000 | 001 | 618 | 01A | 014 | 011 | 010 |

FIG.4

| NUMBER OF DEFLECTION STAGE | LINEAR CHARGING CODE | NON-LINEAR CHARGING CODE | NON-LINEARITY COMPENSATING AMOUNT (C) | PRINT DATA COMPENSATING AMOUNT | | | | | | |
|---|---|---|---|---|---|---|---|---|---|---|
| | | | | $F_3$ | $F_2$ | $F_1$ | $P_1$ | $P_2$ | $P_3$ | $P_4$ |
| 1 | 200 | 209 | 09 | 00 | 00 | 01 | 1E | 08 | 00 | 00 |
| 2 | 220 | 22D | 0D | 00 | 00 | 02 | 0A | 08 | 01 | 01 |
| 3 | 240 | 251 | 11 | 00 | 01 | 03 | 0A | 03 | 01 | 01 |
| 4 | 260 | 274 | 14 | 00 | 01 | 03 | 0B | 04 | 01 | 01 |
| 5 | 280 | 297 | 17 | 00 | 01 | 04 | 0B | 04 | 02 | 02 |
| 6 | 2A0 | 2BA | 1A | 00 | 01 | 05 | 0B | 06 | 02 | 02 |
| 7 | 2C0 | 2DD | 1D | 00 | 01 | 06 | 0C | 06 | 03 | 02 |
| 8 | 2E0 | 300 | 20 | 01 | 01 | 07 | 0D | 07 | 03 | 02 |
| 9 | 300 | 323 | 23 | 01 | 02 | 08 | 0E | 07 | 03 | 02 |
| ⁝ | ⁝ | ⁝ | ⁝ | ⁝ | ⁝ | ⁝ | ⁝ | ⁝ | ⁝ | ⁝ |
| 29 | 580 | 5BB | 3B | 04 | 08 | 12 | 17 | 13 | 0D | 0E |
| 30 | 5A0 | 5DA | 3A | 00 | 08 | 12 | 18 | 13 | 0E | 0E |
| 31 | 5C0 | 5F9 | 39 | 00 | 00 | 12 | 19 | 14 | 0F | 0F |
| 32 | 5E0 | 618 | 38 | 00 | 00 | 01 | 1A | 14 | 11 | 10 |

PRINT-DISTORTION COMPENSATING DEVICE FOR THE INK JET PRINTING APPARATUS

BACKGROUND OF THE INVENTION

The present invention relates to an improved apparatus and method for compensating for distortion in an ink jet printing apparatus.

In general, ink jet printing apparatus produce a series of ink droplets which are successively charged, deflected electrostatically, and conveyed with a trajectory towards a recording medium to perform printing by a series of dots thereon in response to print information. During the time when the respective ink droplets are conveyed, the respective ink droplets effect the flow of air behind them. When a subsequent ink droplet enters into the flow of air, the aerodynamic resistance acting on the subsequent ink droplet becomes smaller. In consequence, the preceding and subsdquent ink droplets may move closer to each other or may combine into one droplet while being conveyed toward the recording, causing distortion of the printed image or character.

Moreover, the respective ink droplets for printing are typically charged by an amount corresponding to the magnitude of the print or charging signal, and a Coulomb's force (electrostatic repulsive force) thus acts between the respective charged ink droplets. This electrostatic repulsive force may further disturb the distance between the respective ink droplets, causing a distortion in the information printed on the record medium. Further, under the influence of the preceding charged ink droplets, the amount of charge applied to the ink droplet just about to be charged may be decreased, thereby causing a similar distortion. For the purpose of solving the afore-mentioned defects, a method as shown in the U.S. Pat. No. 3,946,399 has already been proposed, for example. The invention disclosed in the U.S. Pat. No. 3,946,399 relates to a method of compensating for the charging amount, wherein the pattern to be printed is detected in advance and signals are developed to compensate for the expected distortion of the deflection of the ink droplets due to the mutual influence of the Coulomb's force working between the respective charged ink droplets and the aerodynamic resistance variation, and the charging amount is compensated for in response to these signals.

However, this method is not efficient in the case where many deflection steps, 32 steps for example, are possible for the ink droplets. The reason for that is as follows. As the number of deflection steps increase, the respective ink droplets are positioned more closely together so that the amount of print distortion may increase. In addition, due to the different flight time of each ink droplet which is dependent on the amount of deflection, the amount of distortion differs depending on the amount of deflection. In order to properly compensate for the print distortion, therefore, it is necessary to perform appropriate compensation for each deflection step. The afore-mentioned deflects often present rather difficult problems in the ink jet printing technology.

SUMMARY OF THE INVENTION

In view of the afore-mentioned, a primary object of the present invention is to provide an ink jet printing apparatus and method for improving the quality of printing by compensating for the distortion of the printed information by improving methods and apparatus for compensating such distortion.

A further object of the present invention is to provide an ink jet printing apparatus and method for improving the quality of printing by compensating for the distortion of the printed information which is caused by variation of aerodynamic resistance due to the preceding ink droplets, by the Coulomb's force due to the preceding and subsequent charged ink droplets, and by electrostatic induction due to the preceding charged ink droplets.

A still further object of the present invention is to provide an ink jet printing apparatus and method in which a precise print position for the ink droplets can be obtained by use of an apparatus having the compensation amounts for the print-distortion recorded into the memory such as a ROM, reading out the compensation amounts from the memory device, and finally adding or not adding those signals from the memory device to the basic charging codes.

Other objects, effects and features of the present invention will become more apparent from the following description of preferred embodiments thereof taken in conjunction with the accompanying drawings.

BRIEF DESCRIPTION OF THE DRAWINGS

FIG. 2 is a diagram showing the contents in the memory of a first embodiment of the present invention.

FIG. 4 is a diagram showing the contents in the memory of a second embodiment of the present invention.

DESCRIPTION OF THE PREFERRED EMBODIMENTS

While the ink jet printing apparatus of the present invention is susceptible of numerous physical embodiments, depending upon the environment and requirements of use, a substantial number of the herein shown and described embodiments have been made, tested and used, and all have performed in an eminently satisfactory manner.

Figure 1:
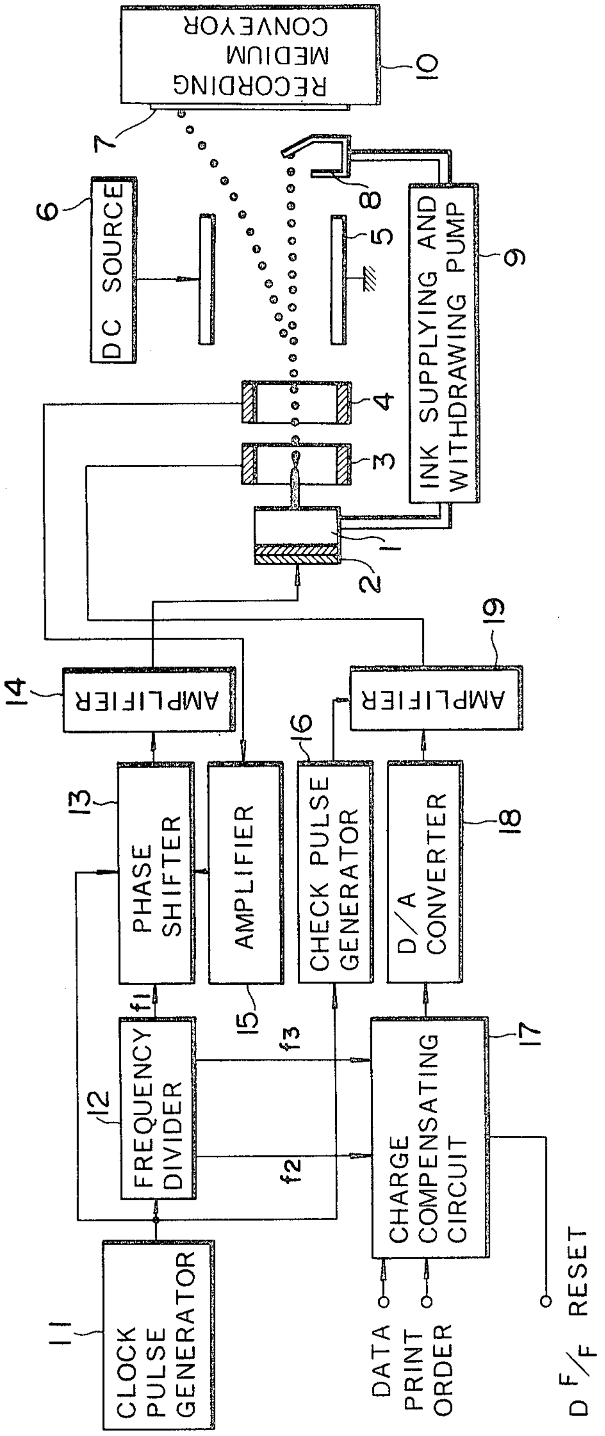
FIG. 1 is a circuit diagram illustrating the main parts of embodiments of the present invention.

FIG. 1 schematically shows the overall construction of an exemplary ink jet printing apparatus to which the present invention is applicable. In the diagram, an ink ejection head 1 is provided for forming a stream of ink droplets at a frequency determined by a piezoelectric element 2. A charging electrode 3 is provided for applying a voltage to the ink droplets to charge them, and a charging-phase checking electrode 4 is provided for sensing the charge on the ink droplets for checking the phase of the charging signals. A pair of deflection electrodes 5 are connected to a high voltage direct current source 6. A sheet 7 of recording paper or a recording medium is moved transversely across the path of the ink droplets by a recording medium conveyor 10 for enabling the charged ink droplets to impinge on the recording medium to form an image or a character thereon. A gutter 8 collects unused ink and a pump 9 serves to withdraw ink from the gutter 8 and supply it back to the ink ejection head 1. A clock pulse generator 11 and a frequency divider 12 are provided along with a phase shifter 13, amplifiers 14 and 15, a check pulse generator 16, a charge compensating circuit 17, a digital-to-analog (D/A) converter 18, and an amplifier 19 for applying the proper signals to the ink droplets.

The ink ejection head 1 is excited by the piezoelectric element 2 with a frequency of 132 kHz. While, in the present description, two uncharged guard ink droplets are provided for each charged ink droplet in order to decrease the extent of distortion, these guard ink droplets are not always necessary. Consequently, the frequency of the charging signal applied to the ink droplets is 44 kHz in order to apply a charge to every third ink droplet. The charging voltage may be adjustable in the range of 80 V to 240 V depending on the input signal representing character information and information to compensate for expected distortion. In FIG. 1, the clock pulse generated by the clock pulse generator 11 has a frequency of 1,056 kHz and that frequency is divided into one eighth, one third and one twenty-fourth, respectively, by the frequency divider 12. The signal having the frequency $f_1$ divided into one eighth is used as an exciting pulse, whose frequency is equal to the breaking-into-droplets frequency, 132 kHz. The signal having the frequency $f_2$ divided into one twenty-fourth is used as a charging pulse of 44 kHz, and the signal having the frequency $f_3$ divided into one third as a compensation clock pulse of 352 kHz.

The charge compensating circuit 17 includes a memory storing information corresponding to the compensating amounts which can be successively read out later, and controls addition or non-addition of the compensating amounts to the basic charging codes depending on the presence or absence of the compensating data. The data added in such a manner are converted into analogue signals with the digital-to-analog converter 18. These converted signals are applied to the charging electrode 3 through the amplifier 19. For this purpose, the compensating amounts are binarily stored in a memory device such as a ROM (Read Only Memory) or RAM (Random Access Memory) provided in the charge compensating circuit 17. Together with the compensating amounts, the basic charging codes are also stored in the same memory device. The basic charging codes have such values as to cause the respective ink droplets to impinge precisely on the desired position on the recording medium, without being subjected to the influence of any other preceding and subsequent ink droplets.

FIRST EMBODIMENT, FIGS. 2 AND 3

FIG. 2 is a diagram of the contents stored in the memory of a first embodiment and shows the aforementioned situation. In the diagram, information stored at any memory address has eleven bits which are divided into three bits, four bits and another four bits to represent the forms of octal, hexadecimal and another hexadecimal, respectively. Accordingly, the memory device is of a construction having eleven parallel bits. In any case, it may be of a construction having address locations of more than eleven, i.e. ×eight dots×thirty-two steps. In FIGS. 2 and 4, the term "stage" is used instead of "step". By way of description, the code 7FF at the thirty-first step of $F_2$ shown in the table of FIG. 2 is the code for adding a complement added to the basic charging code to perform a subtraction of "1" from the basic charging code. Also, since the aerodynamic resistance varies depending on the amount of deflection, the charging code becomes non-linear. The compensating amount is determined on the basis of the single ink droplet. The basic charging code and the compensating amount can be calculated from the simulation results using an electronic computer, and they may be corrected later according to the result of experiments.

The relationship between the codes shown in the table of FIG. 2 and the voltages applied to the charging electrode 3 is described as follows; For example, the code value "618" shown at the thirty-second step of $V_{cs}$ is equivalent to 240 V. Namely, the code value "618" represented in the forms of octal, hexadecimal and another hexadecimal is equivalent to the value in the decimal form, shown below;

THE CODE VALUE "618" = 1 1 0 / 0 0 0 1 / 1 0 0 0

$$\begin{array}{ccccccccccc} 1 & 1 & 0 & 0 & 0 & 0 & 1 & 1 & 0 & 0 & 0 \\ \uparrow & \uparrow & \uparrow & \uparrow & \uparrow & \uparrow & \uparrow & \uparrow & \uparrow & \uparrow & \uparrow \\ 2^{10} & 2^9 & 2^8 & 2^7 & 2^6 & 2^5 & 2^4 & 2^3 & 2^2 & 2^1 & 2^0 \end{array}$$

$$= 2^{10} + 2^9 + 2^4 + 2^3$$
$$= 1024 + 512 + 16 + 8$$
$$= 1560$$

And the voltage $V_{cs32}$ applied to the charging electrode is equal to 240 V.

$$V_{cs32} = (1560/1560) \times (240\ V) = 240\ V$$

The code value "209" shown at the first step of $V_{cs}$ is equivalent to 80 V. Namely, the code value "209" is equivalent to the value in the decimal form, shown below;

THE CODE VALUE "209" = 0 1 0 / 0 0 0 0 / 1 0 0 1

$$= 2^9 + 2^3 + 2^0$$
$$= 512 + 8 + 1$$
$$= 521$$

And the voltage $V_{cs1}$ applied to the charging electrode is nearly equal to 80 V.

$$V_{cs1} = (521/1560) \times (240\ V) \approx 80\ V$$

Generally, the code value "$CV_{csi}$" shown at the i-th step of $V_{cs}$ is equivalent to $V_{csi}$ V.

$$V_{csi} = \frac{\text{Decimal Value of } CV_{csi}}{1560} \times (240V)$$

With respect to $F_1$ to $F_3$ and $P_1$ to $P_4$, the equivalent voltage values can also be obtained in a similar manner.

The code value "7FF" shown at the thirty-first step of $F_2$ is represented as follows;

THE CODE VALUE "7FF" = 1 1 1 / 1 1 1 1 / 1 1 1 1

$$\begin{array}{r} 000/0000/0000 \\ -)\ 000/0000/0001 \\ \hline 111/1111/1111 \end{array}$$

Namely, adding the code value "7FF" to the basic charging code means subtracting "1" from the basic charging code. The code value "7FF" is added to the basic charging code value "5F9", and in consequence the added value becomes

101/1111/1000 as shown below;

```
  101/1111/1001
+)111/1111/1111
  101/1111/1000
```

The symbols A to F in the table of FIG. 2 represent 10 to 15, respectively, in the hexodecimal form. In the foregoing, the method of converting the code value shown in the table of FIG. 2 into the value of voltage applied to the charging electrode has been described. The method of converting the code value shown in the table of FIG. 4 into the voltage value is quite the same. In such a manner, the code value is converted into the voltage value by use of the digital-to-analog converter.

Figure 3:
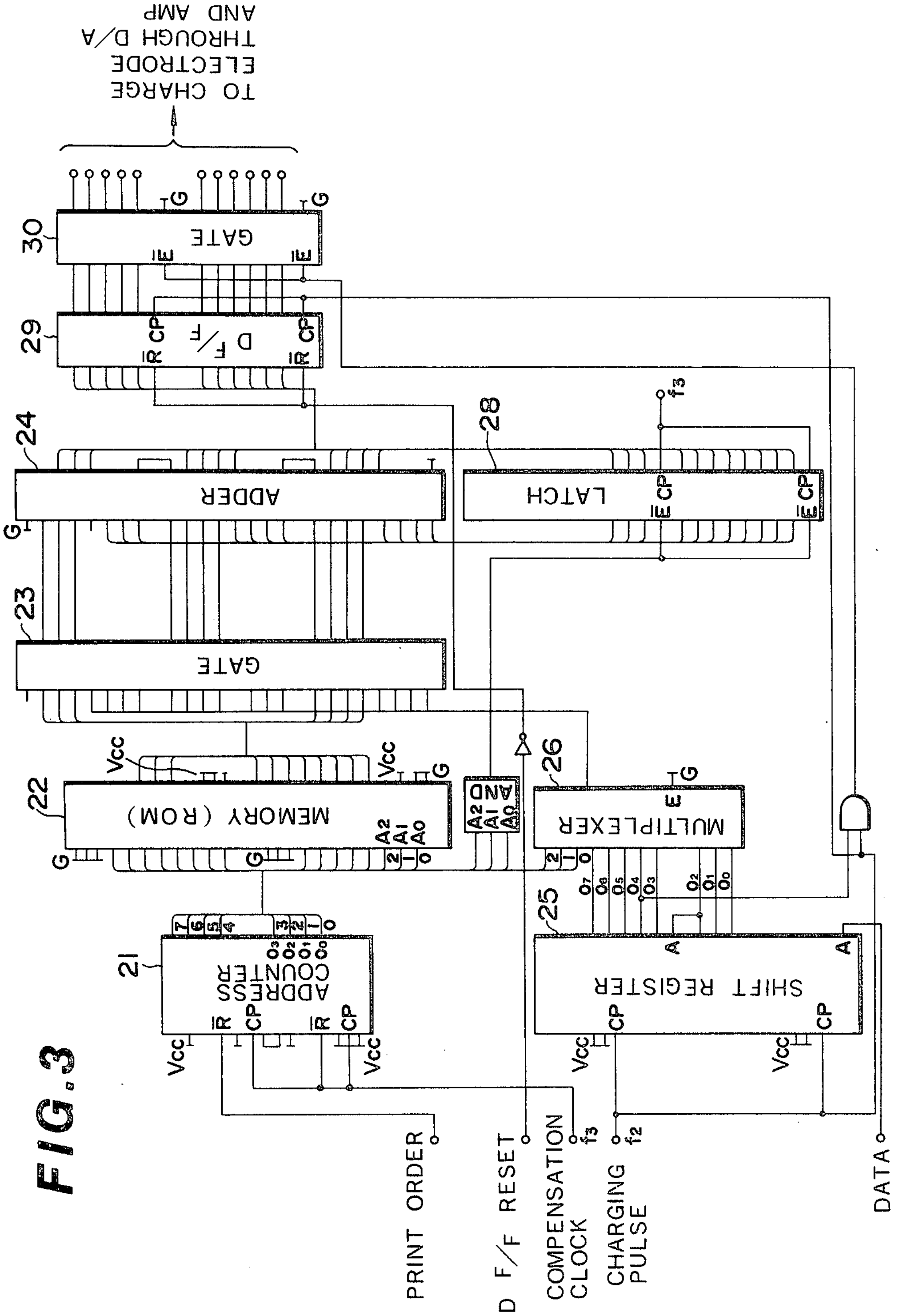
FIG. 3 is a detailed circuit diagram of the charge compensating circuit shown in FIG. 1 of the first embodiment.

FIG. 3 is a detailed circuit diagram of the charge-compensating circuit 17 of the first embodiment. In the diagram, 21 indicates an address counter; 22, a memory (ROM, for example); 23, a gate circuit; 24, an adder, 25, a shift register; 26, a multiplexer, 28, a latch circuit; 29, a D type flip-flop circuit; and 30, a gate circuit. The performance of the respective circuits is described below;

(1) When the PRINT ORDER signal reaches a high level, the address counter 21 becomes enabled to operate and is counted up by the compensation clock signal $f_3$. As the frequency of the compensation clock signal $f_3$ is eight times as great as that of the charging pulse signal $f_2$, the eight groups of data shown in the table of FIG. 2 are serially read out during one cycle of the charging pulse.

(2) The PRINT datum is delayed with the shift register 25. The output $O_3$ represents the datum to be charged. Stated more precisely, $O_0$, $O_1$ and $O_2$ represent the subsequent charged ink droplets and correspond to $F_3$, $F_2$ and $F_1$ shown in FIG. 2, respectively. $O_4$ to $O_7$ represent the preceding charged ink droplets and correspond to $P_1$ to $P_4$ shown in FIG. 2, respectively.

(3) The lower-column three bits in the address counter 21 are applied to the multiplexer 26, which is controlled so as to output the content of $O_0$ when the content of the lower-column three bits is "0" and output the content of $O_1$ when the content of the lower-column three bits is "1". In other words, the total of eight data, that is 4 preceding data, the PRINT datum, and 3 subsequent data, are selected in accordance with the content of the lower-column three bits in the address counter 21.

(4) The output of the multiplexer 26 is applied to the gate circuit 23. The output of the memory 22 is controlled by the gate circuit 23. Namely, if the output of the multiplexer 26 indicates a compensation to be needed, the output of the memory 22 is applied to the adder 24 through the gate circuit 23 and added to the basic PRINT signal as a compensating value. Then, the output of the adder 24 is delayed with the latch circuit 28 and added to the next compensating value. However, it is constructed such that the input signal of the latch circuit 28 is inhibited and the content of the latch circuit 28 is set at "0", when the content of the lower-column three bits in the address counter 21 becomes "7".

(5) The output of the adder 24 is also applied to the D type flip-flop circuit 29 and sampled at the leading edge of the charging pulse signal. In consequence, the compensated value is memorized in the D type flip-flop circuit 29 and printing is controlled so as to eliminate or reduce distortion in accordance with the presence or absence of the PRINT data. Namely, when the print data exist, those data are transmitted as the charging code to the digital-to-analog converter 18 through the gate circuit 30, whereby printing may be compensated.

As is apparent from the afore-mentioned description, an adequate compensation corresponding to the presence or absence of the PRINT data and the number of the deflection steps may be accomplished according to the present invention. While the present invention has been described with respect to the first embodiment in which the basic charging code amount $V_{cs}$ corresponding to the number of deflection steps is memorized in the same memory, it is also possible to use other compensation-signal-generating means. Further, although the description has been made with respect to a successive printing, it is also possible to compensate for the printing positions in the case of a non-successive printing by memorizing the amount $V_{cs}$ in the form of non-successive pattern in the memory (ROM). In case of a non-successive printing, the flying row is assumed, and the compensating amount for the designated ink droplets on the preceding row is determined.

SECOND EMBODIMENT, FIGS. 4 AND 5

Up to here, the apparatus and method of the present invention have been described on the assumption that the basic charging signals have the values compensated for their non-linear error distortion. In the case of deflection of a single ink droplet, the relationship between the charging code and the deflection amount is not linear in practice, because the aerodynamic resistance differs depending on the deflection amount. In addition, the charging code is also not linear when the deflection amounts are linearly arranged, and so the distortion amount from the linear value is memorized in the aforementioned memory as a compensating amount.

As a second embodiment, FIG. 4 represents the contents of the memory; the charging code linearly generated, the charging code compensated for the non-linear error (non-linear charging code in the table of FIG. 4), the non-linearity compensating amount (c), and the PRINT data compensating amount. This means that the compensating amount corresponding to the PRINT data and the non-linearity compensating amount for a single ink droplet are stored in the memory. These compensating amounts are represented in the form of hexadecimal code. The charging codes are composed of eleven bits, which are divided into the groups of three bits, four bits and another four bits to be represented in the forms of octal, hexadecimal and another hexadecimal, respectively. The linear charging code is set at a smaller value than the non-linear charging code to enable compensation by the performance of addition only. The respective compensating amounts can be calculated from the results of simulation using an electronic computer, and they may be corrected later according to the result of experiments.

Figure 5:
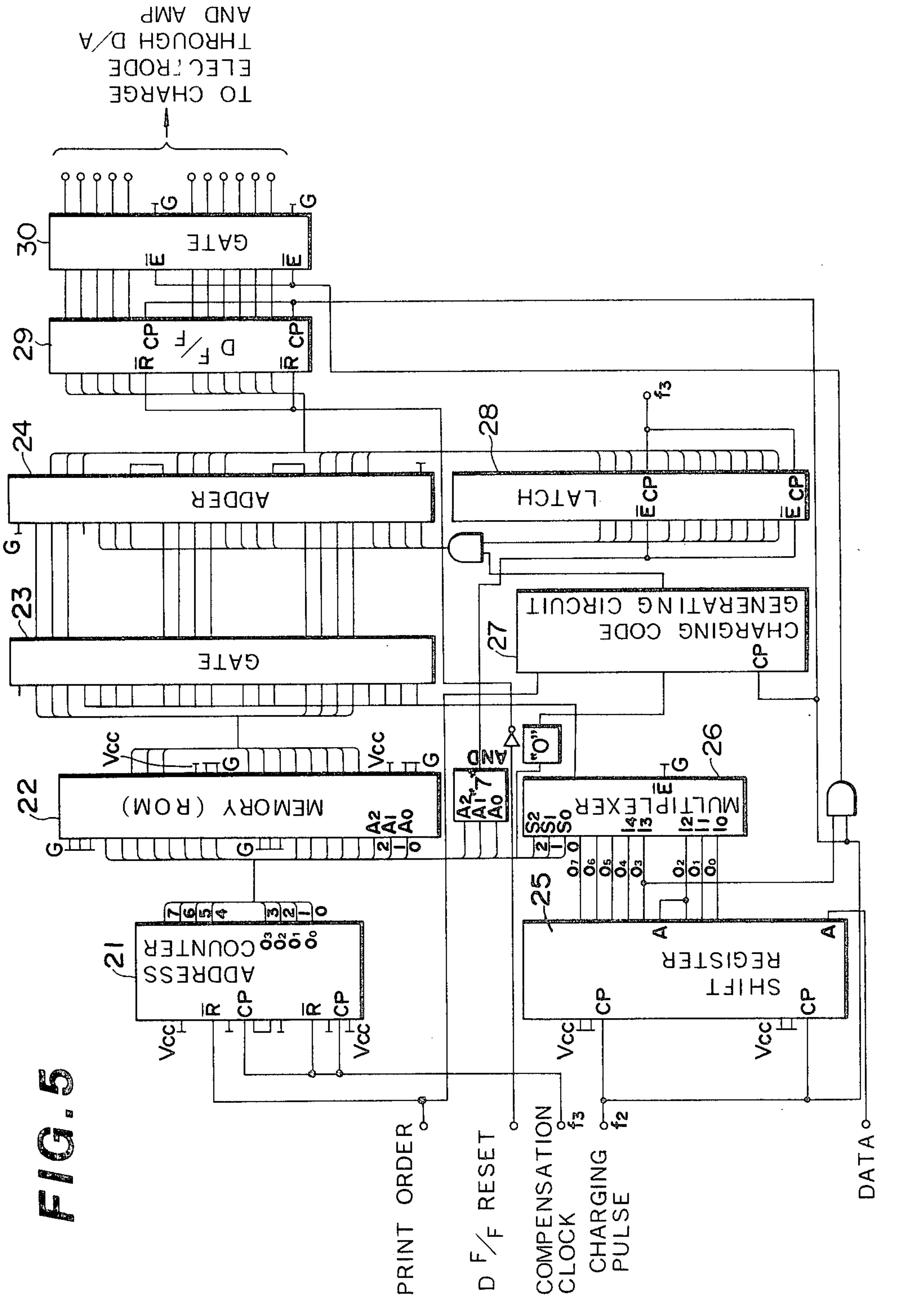
FIG. 5 is a detailed circuit diagram of the charge compensating circuit shown in FIG. 1 of the second embodiment.

FIG. 5 is a detailed circuit diagram of the charge-compensating circuit 17 of the second embodiment. In the diagram, 21 to 26 and 28 to 30 indicate the same circuit blocks as those shown in FIG. 3, and 27 indicates a charging code generating circuit. The performance of the respective circuits is described below;

(1) when the PRINT ORDER signal reaches a high level, the address counter 21 becomes enabled to operate and then the counter 21 is counted up by the compensation clock signal $f_3$. As the compensation clock signal $f_3$ has a frequency eight times as great as that of the charging pulse signal $f_2$, the eight groups of data shown in the table of FIG. 4 are laterally read out during one cycle of the charging pulse.

(2) The PRINT datum is delayed with the shift register 25. The output $O_3$ represents the datum to be charged. Namely, stated more precisely, $O_0$, $O_1$ and $O_2$ represent the subsequent charged ink droplets and correspond to $F_3$, $F_2$ and $F_1$ shown in FIG. 4, respectively. $O_4$ to $O_7$ represent the preceding charged ink droplets and correspond to $P_1$ to $P_4$ shown in FIG. 4, respectively.

(3) The lower-column three bits in the address counter 21 are applied to the multiplexer 26. When the content of the lower-column three bits of the address counter 21 is "0", the output of the multiplexer 26 is set at "high" as the input $I_0$ of the multiplexer 26 becomes "high", whereby the compensating amount (c) for the non-linear error in the memory 22 is applied to the adder 24 through the gate circuit 23. At the same time, "200" is loaded into the charging code generating circuit 27, which is counted up by the charging pulse $f_2$, whose content is applied to the adder 24 when the lower-column three bits are "0". In consequence, the amount compensated for the non-linear error is obtained as an output of the adder 24 and is memorized in the latch circuit 28. When the content of the lower-column three bits becomes "1", the content of $O_0$ is generated as the output of the multiplexer 26 and the content of $F_3$ is controlled by the gate circuit 23 depending on the state of "low" or "high" in the multiplexer 26, with the result that whether or not the content of $F_3$ is applied to the adder 24 is controlled according to the PRINT data. Namely, $O_1$ to $O_3$ or $O_4$ to $O_7$ are selected as an output of the multiplexer 26 in accordance with the contents 2 to 7 of the lower column three bits and the application of the respective compensating amount to the adder 24 is controlled by the PRINT data. The output of the adder 24 is delayed by the latch circuit 28 and added to the next compensating amount. However, the input to be applied to the latch circuit 28 is inhibited and its content is set at "0" when the content of the lower-column three bits becomes "7".

(4) The output of the adder 24 is also applied to the D type flip-flop circuit 29 and sampled at the leading edge of the charging pulse. Consequently, the compensated amount is memorized in the D type flip-flop circuit 29 and printing is controlled by the presence or absence of the PRINT datum. Namely, when the data represents "presence", the compensated amount is transmitted as a charging code to the digital-to-analog (D/A) converter 18 through the gate circuit 30, whereby the print distortion may be compensated.

As is apparent from the afore-mentioned description, an adequate compensation corresponding to the presence or absence of the PRINT data and the number of the deflection steps is possible according to the present invention. In the case of the second embodiment shown in FIG. 5, the compensating amount to be memorized may be $8 \times 8 \times 32$ bits, as it is so arranged that the basic charging code is generated from the charging code generating circuit 27. Although the second embodiment in which printing is successively performed has heretofore been described, it will be readily understood that, in the case of non-successive printing, too, the print distortion may adequately be compensated through re-arrangement of the compensating pattern and the basic charging code.

Moreover, by separating the memory into several blocks, the print distortion due to pressure, temperature, viscosity of ink, and so on, may be compensated. While, in the preferred embodiments compensation is performed with respect to the influence by 4 preceding ink droplets and 3 subsequent ink droplets, the number of ink droplets that may be compensated is not limited to that described here, since the number may vary depending on the distance from the ink ejection head to the recording medium.

While the present invention has been particularly disclosed and described with reference to preferred embodiments thereof, it will be understood by those skilled in the art that various changes in form and details may be made without departing from the spirit and scope of the present invention.

What is claimed is:

1. An ink jet printing apparatus for forming images or characters on a recording medium by deflecting ink droplets within a series thereof through any one of a multitude of deflection steps according to basic charging codes comprising:

ink ejection means for ejecting a jet of ink through a nozzle and breaking up said ink jet into ink droplets;

charging electrode means for charging said ink droplets; in response to printing signals;

charging-phase checking electrode means for checking the charging-phase by detecting a charge on said charged ink droplets;

a pair of deflection electrode means for deflecting said charged ink droplets and adapted to be connected to a high voltage direct current source;

a gutter for collecting the unused ink;

an ink supplying and withdrawing pump for supplying ink to said ink ejection means and withdrawing said unused ink collected in said gutter;

a recording medium conveyor for conveying the recording medium on which the charged ink droplets impinge to form the images or characters thereon; and compensation means for compensating for distortion of the printing position of said ink droplets caused by an influence of neighboring ink droplets, said compensation means including memory means storing signals corresponding to various compensating amounts for each of a predetermined number of neighboring ink droplets, each of said compensating amounts corresponding to the degree of deflection of the associated ink droplet, and means for reading out said compensating amounts and controlling the addition or non-addition of said compensating amounts to said basic charging codes depending on the presence or absence of ink droplets neighboring an ink droplet to be charged.

2. An ink jet printing apparatus as in claim 1, wherein said compensation means comprises a clock pulse generator, a frequency, divider, a phase shifter, amplifiers, a digital-to-analog converter, a check pulse generator, and a charge compensating circuit including an address counter, a memory, gate circuits, an adder, a shift register, a multiplexer, a latch circuit, and a D flip-flop circuit.

3. An ink jet printing apparatus for forming images or characters on a recording medium by deflecting ink droplets within a series thereof through any one of a multitude of deflection steps according to basic charging codes varying linearly, comprising:

ink ejection means for ejecting a jet of ink through a nozzle and breaking up said ink jet into ink droplets;

charging electrode means for charging said ink droplets in response to printing signals;

charging-phase checking electrode means for checking the charging-phase by detecting a charge on said ink droplets;

a pair of deflection electrode means for deflecting said charged ink droplets and adapted to be connected to a high voltage direct current source;

a gutter for collecting the unused ink;

an ink supply and withdrawing pump for supplying ink to said ink ejection means and withdrawing said unused ink collected in said gutter;

a recording medium conveyor for conveying the recording medium on which the charged ink droplets impinge to form the images or characters thereon; and compensation means for compensating for distortion of the printing position of said ink droplets caused by the influence of neighboring ink droplets and for the non-linear response of an ink droplet to the linear basic charging code, said compensation means including memory means storing signals corresponding to various compensating amounts for each of a predetermined member of said neighboring ink droplets, each of said compensating amounts corresponding to the degree of deflection of the associated ink droplets, and means for reading out said compensating amounts and controlling addition or non-addition of said compensating amounts to said basic charging codes depending on the presence or absence of ink droplets neighboring an ink droplet to be charged.

4. An ink jet printing apparatus as in claim 3, wherein said compensation means comprises a clock pulse generator, a frequency divider, a phase shifter, amplifiers, a digital-to-analog converter, a check pulse generator, and a charge compensating circuit including an address counter, a memory, gate circuits, an adder, a shift register, a multiplexer, a charging code generating circuit, a latch circuit and a D flip-flop circuit.

5. An ink jet printing apparatus as in claim 2, wherein the output of said compensation means is applied to said charging electrode means through said digital-to-analog converter and said amplifier.

6. An ink jet printing apparatus as in claim 2, wherein a charging voltage applied to said charging electrode means is varied so as to control the charging amount on the respective ink droplets with said compensation means while a constant output voltage of said high voltage direct current source is applied to said deflection electrode means.

7. An ink jet printing apparatus as in claim 4, wherein the output of said compensation means is applied to said charging electrode means through said digital-to-analog converter and said amplifier.

8. An ink jet printing apparatus as in claim 4, wherein a charging voltage applied to said charging electrode means is varied so as to control the charging amount on the respective ink droplets with said compensation means while a constant output voltage of said high voltage direct current source is applied to said deflection electrode means.

9. An ink jet printing method for forming images or characters on a recording medium by deflecting ink droplets within a series thereof through any one of a multitude of deflection steps according to basic charging codes, comprising the steps of:

ejecting a jet of ink through a nozzle of an ink ejection means, said ink jet being broken up into ink droplets;

charging said ink droplets with charging electrode means in response to printing signals;

checking charging-phase with charging-phase checking means by detecting a charge on said charged ink droplets;

deflecting said charged ink droplets with a pair of deflection electrode means;

collecting unused ink in a gutter;

supplying ink to said ink ejection means and withdrawing unused ink collected in said gutter with an ink supplying and withdrawing pump;

conveying a recording medium with a recording medium conveyor;

storing in a memory signals corresponding to various compensating amounts for print distortion due to the influence of neighboring ink droplets, said compensating amounts each corresponding to the degree of deflection of the associated ink droplets;

reading out said compensating amounts for print-distortion from said memory; and controlling addition or non-addition of said compensating amounts to said basic charging codes depending on the presence or absence of ink droplets neighboring an ink droplet to be charged.

10. An ink jet printing method for forming images or characters on a recording medium by deflecting ink droplets within a series thereof through any one of a multitude of deflection steps according to basic charging codes varying linearly comprising the steps of:

ejecting a jet of ink through a nozzle of an ink ejection means, said ink jet being broken up into ink droplets;

charging said ink droplets with charging electrode means in response to printing signals;

checking charging-phase with charging-phase checking means by detecting a charge on said charged ink droplets;

deflecting said charged ink droplets with a pair of deflection electrode means;

collecting unused ink in a gutter;

supplying ink to said ink ejection means and withdrawing unused ink collected in said gutter with an ink supplying and withdrawing pump;

conveying a recording medium with a recording medium conveyor;

storing in a memory signals corresponding to various compensating amounts for print distortion due to the influence of neighboring ink droplets and for the non-linear response of an ink droplet to the linear basic charging codes, said compensating amounts each corresponding to the degree of deflection of the associated ink droplet;

reading out said compensating amounts for print-distortion from said memory; and controlling addition or non-addition of said compensating amount to said basic charging codes depending on the presence or absence of ink droplets neighboring an ink droplet to be charged.

* * * * *